Figure 1:
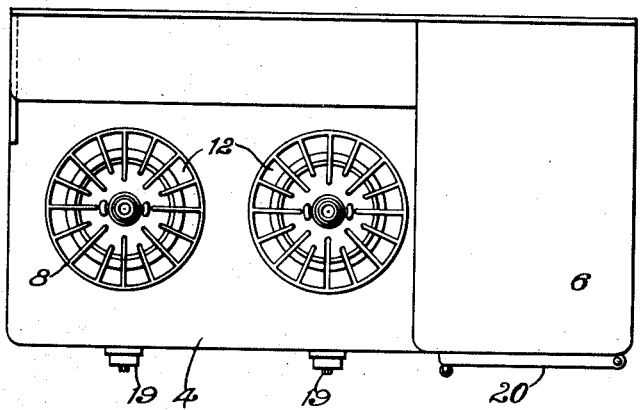

F. THORNTON, Jr.
RADIANT HEATER FOR ELECTRIC RANGES.
APPLICATION FILED NOV. 20, 1919.

1,387,521.

Patented Aug. 16, 1921.

WITNESSES:
J. B. Merrill
N. M. Biebel

INVENTOR
Frank Thornton Jr.
BY
Wesley G. Carr
ATTORNEY

UNITED STATES PATENT OFFICE.

FRANK THORNTON, JR., OF MANSFIELD, OHIO, ASSIGNOR TO WESTINGHOUSE ELECTRIC PRODUCTS COMPANY, A CORPORATION OF MICHIGAN.

RADIANT HEATER FOR ELECTRIC RANGES.

1,387,521.     Specification of Letters Patent.     Patented Aug. 16, 1921.

Application filed November 20, 1919. Serial No. 339,291.

*To all whom it may concern:*

Be it known that I, FRANK THORNTON, Jr., a citizen of the United States, and a resident of Mansfield, in the county of Richland and State of Ohio, have invented a new and useful Improvement in Radiant Heaters for Electric Ranges, of which the following is a specification.

My invention relates to electrical cooking apparatus and particularly to heating elements for such apparatus.

The object of my invention is to provide a device which will permit of cooking food by reflected heat and wherein the heating elements will have a relatively small heat-storage capacity.

Heretofore, food has been cooked either by placing it in a cooking utensil and heating it by radiated, conducted or convected heat or by subjecting the article of food itself to radiated heat.

As examples of these various methods, may be mentioned the operation of cooking where a utensil is so placed on a support as to be a small distance above a source of heat, in which case the heat will be transmitted largely by radiation; in case the utensil is placed directly in contact with a heated body, the heat is transmitted by conduction; in case a utensil is placed in a closed oven and a screen is mounted between the utensil and the source of heat, the utensil will be heated by convection.

Cooking by radiated heat demands careful attention throughout the process to preclude uneven heating and possible burning or scorching of the food. Where cooking is done by conducted heat, the heat-storage capacity of the heat-conducting body may be large, and a relatively large amount of heat must first be stored by this body before it can transmit any to the cooking utensil, thus delaying the process of cooking and reducing the efficiency thereof. Where a cooking utensil is placed in an oven to be heated by convection, the temperature of the inner surface of the oven must be raised to substantially the same value as that of the heated air in the oven, and, unless the oven itself is heat-insulated on its outer surface, a relatively large amount of heat will be radiated into the surrounding air, with consequent lowered efficiency, as well as delay in reaching the temperature desired for the cooking operation.

The desiderata for efficient cooking processes, therefore, comprise a relatively small heat-storage capacity of the heater itself and of any part of the stove or oven, and that the applied heat shall be uniformly distributed.

In practising my invention, I provide a radiant heater as the source of heat, this heater preferably comprising a concave reflector having a highly polished inner surface and a resistor wound on the surface of a cylindrical supporting member of relatively low heat-storage capacity and in axial alinement in said reflector.

Figure 2:
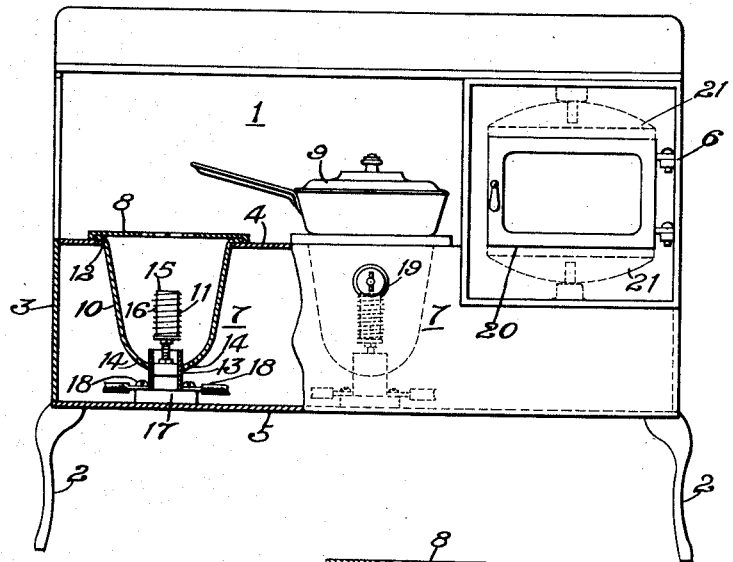
Figure 3:
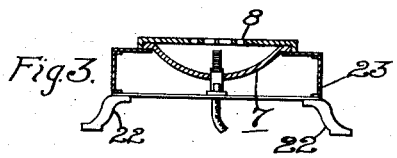

In the single sheet of drawings, Figure 1 is a top plan view of an electric range comprising a device embodying my invention, Fig. 2 is a front view, partly in section, of the range shown in Fig. 1, and Fig 3 is a cross-sectional view of a hot plate comprising a device embodying my invention.

An electric range 1 comprises a plurality of supporting members 2 and a frame 3 provided with a stove top 4 and a bottom plate 5, an oven 6 and a plurality of stove-heating elements 7 suitably disposed in the frame 3. Each stove heater comprises a rack 8 for supporting a cooking utensil 9, a concave reflector 10 having a highly polished inner surface, and an electric heating element 11. The reflector 10 is preferably suspended from the stove top 4 through a circular opening 12 therein and is provided with an axial opening 13, and a plurality of relatively small drainage openings 14 near the lower end of the reflector. The electric heating element may be substantially cylindrical in shape and comprises a refractory hollow cylinder 15 on the surface of which is wound a resistor 16. The mass of the heating element proper is made as small as possible so as to reduce the heat-storage capacity to a relatively small amount.

The heating element is mounted on a support 17 which may, in turn, be mounted on the bottom plate 5. Suitable contact terminals 18 are indicated, by means of which connection may be made to line conductors, and switches 19 are provided to control the energization of the heater elements. No specific details are shown of the control circuits or of the switches as this is not a part of my invention and any desired arrangement of the apparatus and any method of control may be used.

The oven 6 may be of the usual heat-insulated construction and is provided with a door 20 to permit of placing therein and removing therefrom the articles of food to be cooked. Two heating elements 21 are mounted, respectively, at the top and at the bottom of the oven, each comprising a concave reflector 10 and a heating element 11 suitably mounted and provided with the usual control switches (not shown).

In Fig. 3 is shown a hot plate comprising suitable supporting members 22, a relatively shallow frame 23, a stove top 8, and a heater unit 7 of substantially the same construction as the stove-heating elements. The usual control switches (not shown) may be applied to the hot plate as desired.

It will be noted that the arrangement of the device embodying my invention is such that the heat-storage capacity is relatively small and that substantially all of the heat generated is transmitted to the cooking utensil or to the food by reflection, with some attendant convection. As the resistor is not embedded and as the resister support is relatively small, substantially the full amount of heat generated is delivered immediately after energization of the heating element. It is possible to easily and quickly remove the reflector for cleaning by first removing the rack or support 8 after which the reflector may be lifted out. While I have shown a cooking utensil as the means for supporting or containing the article of food being cooked, it is to be understood that this utensil may be omitted, when not required, as when broiling a steak.

While I have shown a specific embodiment of my invention, various changes may be made therein without departing from the spirit and the scope thereof and I desire that only such limitations shall be placed thereon as are imposed by the prior art or are specifically set forth in the appended claims.

I claim as my invention:

1. In a cooking apparatus, the combination with a food-supporting means, of an electric heating element, and a reflector adapted to reflect substantially all of the heat generated by said heating element against said supporting means.

2. In a cooking apparatus, the combination with a food support, of an electric heating element, and a concave reflector surrounding said element and adapted to reflect the heat generated by said element in a direction substantially parallel to the axis of said reflector and against said food support.

3. In an electric stove, the combination with a food support, of an electric heating element and a concave reflector surrounding said heating element and adapted to reflect substantially all of the heat generated by said heating element against said food support.

4. In an electric stove, the combination with a food-supporting means, of a concave reflector mounted in said supporting means, and an electric heating element in axial alinement in said reflector and adapted to reflect the heat rays of said heating element against said supporting means.

5. In an electric stove, the combination with a food-supporting frame, of a concave reflector suspended in said frame, and an electric heating element of relatively low heat-storage capacity located in axial alinement in said reflector and adapted to reflect the heat rays of said heating element against said food-supporting frame.

6. In an electric stove, the combination with a food-supporting frame, of an electric heating element out of direct contact with said frame and having a relatively small heat storage capacity, and means adapted to secure delivery against said frame of substantially all of the heat generated by said heating element instantaneously after energization of said element.

7. In an electric stove, the combination with a food-supporting frame, of a concave reflector suspended in said frame and having an axial opening, a heating element located in said reflector and adapted to heat said supporting frame by reflected heat, and a supporting member for said heating element located beneath said reflector and projecting into the same through said axial opening.

8. In an electric stove, the combination with a food-supporting means, of a plurality of concave reflectors mounted in spaced relation around said supporting means and electrical heating means located in said reflectors and adapted to heat said supporting means by reflected heat.

9. In an electric stove, the combination with a cooking utensil, of a plurality of concave reflectors mounted in spaced relation around said utensil and out of direct contact therewith and electrical heating means located in said reflectors and adapted to heat said cooking utensil by reflected heat.

In testimony whereof, I have hereunto subscribed my name this 6th day of Nov., 1919.

FRANK THORNTON, Jr.